Dec. 13, 1932.   J. E. HOOVER   1,890,907

SKEWER

Filed April 2, 1931

Inventor:
John E. Hoover.
by Charles H. Hill Attys.

Patented Dec. 13, 1932

1,890,907

UNITED STATES PATENT OFFICE

JOHN E. HOOVER, OF ELMHURST, ILLINOIS

SKEWER

Application filed April 2, 1931. Serial No. 527,221.

In the roasting or baking of articles of food such as roast of beef and other meats and in the baking of potatoes and the like it has been found that the articles subjected to heat in an oven or cooker are cooked from the exterior portion inwardly toward the center. The articles thus roasted or cooked have the outer portions thereof more thoroughly roasted or cooked while the inner or central portions still remain partially cooked thereby making it necessary to subject the roast or article to heat for a sufficient period of time to permit the roast or article to be cooked as desired. This old method requires considerable time and the burning of fuel, both of which items are ordinarily desired to be reduced by housewives or cooks to not only save time but to reduce the cost of preparing foods.

The present invention relates to an improved skewer adapted for use in roasting meats, vegetables or other foods by forcing the body portion of an improved skewer so that the head of the skewer is in substantially the middle portion of the meat and permitting the supporting plate of the skewer to rest upon the bottom plate of a roasting pan to afford a means whereby heat absorbed by the base plate is adapted to be transmitted by means of a center stem upwardly through an insulating air chamber to the head portion of the skewer for the purpose of conducting heat to the middle portion of the meat or article being roasted to shorten the time required for the cooking of meats and the like thereby reducing the cost and the amount of fuel.

It is an object of this invention to provide type of cooking skewer wherein a chambered sleeve is removably secured in position upon a base heating plate by means of a skewer head and a stem, the latter of which projects axially through the chambered sleeve and is connected with the base plate to conduct heat therefrom to the head of the skewer.

It is also an object of this invention to provide an improved type of cooking skewer provided with a closed air chamber between the base and head of the skewer to permit heat from the base plate to be conducted upwardly through an axial stem to the upper portion of a skewer to facilitate the cooking of meats and the like from the interior as well as from the exterior.

It is a further object of this invention to provide an improved type of cooking skewer embodying a pointed shank or body portion provided with an air chamber surrounding a heat conducting element which is connected with the base plate of the skewer to facilitate the conducting of heat to the upper pointed portion of the skewer for the purpose of transmitting or applying to the interior portion of a roast of meat or the like to permit roasting of the meat from the interior as well as from the exterior to shorten the time of roasting with a corresponding reduction in fuel consumption.

It is an important object of this invention to provide an improved and simplified form of cooking skewer constructed of a plurality of removably connected parts to facilitate cleaning of the skewer which embodies in its construction a hollow or chambered body portion insulated for slightly contacting the supporting base of the skewer to permit heat from the base plate to be conducted upwardly through a heat conducting member to the upper or head portion of the skewer to facilitate cooking of articles from the interior as well as from the exterior to reduce both the time and cost of cooking.

Other and further important objects of this invention will be apparent from the disclosures in the specification and the accompanying drawing.

The invention (in a preferred form) is illustrated in the drawing and hereinafter more fully described.

On the drawing:

Figure 1 is a perspective view of a roasting pan having disposed therein a meat roast indicated in dotted lines into which an improved skewer embodying the principles of this invention is engaged with the base of the skewer supported on the bottom of the pan to permit heat to be conducted upwardly through a conducting stem projecting through an air chamber for delivery to the head or upper portion of the skewer.

Figure 1:
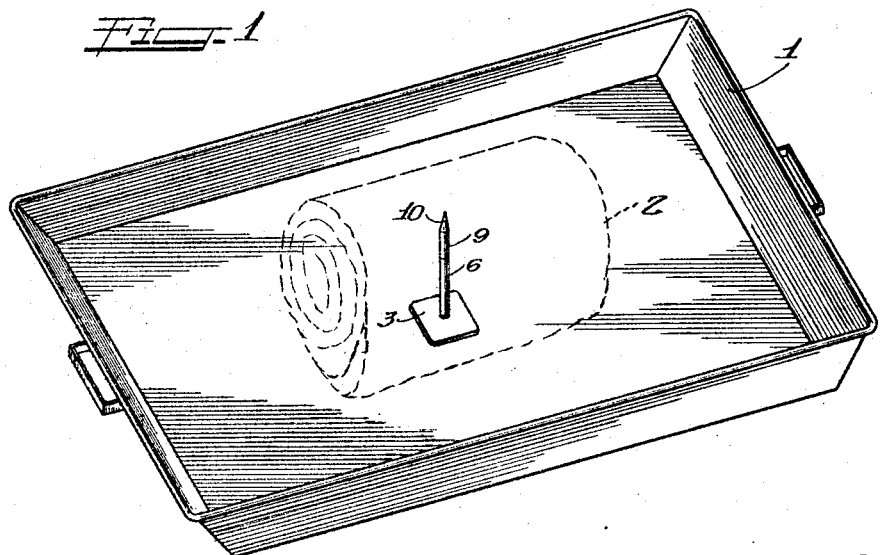

The reference numeral 1 indicates a meat roasting pan having disposed therein a meat roast illustrated in dotted lines and designated by the reference numeral 2. Positioned in the roasting pan 1 and engaged in the meat roast 2 is an improved skewer embodying the principles of this invention.

Figure 2:
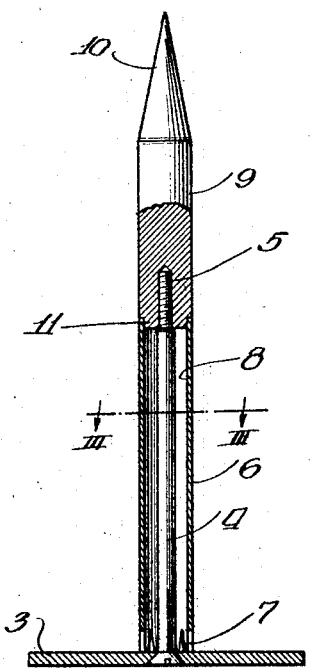
Figure 2 is an enlarged vertical detail section of the skewer with parts shown in elevation.

The improved skewer as illustrated in Figures 1 and 2 comprises a metal base plate 3 having a central opening therein which is countersunk for the reception of a slotted head of a heat conducting rod or stem 4 constructed of metal and having the upper end threaded as at 5. Removably engaged over the stem 4 is a sleeve or casing 6 constructed of metal or other suitable material with the lower end of the sleeve notched or cut to provide a plurality of teeth or pointed supporting members 7 which are adapted to rest upon the top surface of the base plate 3 to reduce the contact between the sleeve and the base plate to a minimum. The sleeve or casing 6 affords an air chamber 8 between the stem 4 and the inner walls of the sleeve. The chambered sleeve or casing 8 is removably secured in position in spaced relation with respect to the stem 4 by means of a solid metal skewer head or upper tip section 9 the upper end of which is tapered to provide a pointed tip 10. The skewer head 9 is of cylindrical form and is of a diameter substantially the same as the diameter of the sleeve 6. The lower end of the skewer head 9 is provided with a threaded axial opening to permit the head to be threaded upon the upper threaded portion 5 of the stem 4. The lower end of the skewer head 9 is provided with a peripheral groove to form a spacing collar or band 11 which, when the skewer portions are assembled, projects into the upper end of the sleeve 6 to hold the same properly spaced from the stem 4. With the tightening of the skewer head 9 upon the threaded upper end 5 of the stem 4 the sleeve 6 is tightly clamped in position with the toothed lower end thereof engaged upon the base plate 3.

The improved skewer is intended for use in the cooking of meat roast and the like and is also adaptable for use in the baking of potatoes and other articles of food which ordinarily require extra time in the cooking or preparing thereof in order to have them thoroughly cooked throughout. With the improved skewer of this invention it is intended to reduce the cost of preparing foods by reducing the ordinary time required for the cooking of foods such as meat roasts, potatoes and other articles of food by reducing the fuel consumption. This is accomplished due to the fact that the improved skewer is adapted to be inserted into the bottom of the meat roast 2 as indicated in Figure 1, so that the metal head 9 of the skewer is positioned in substantially the middle or inner portion of the roast which ordinarily cooks the slowest. With the improved skewer, it is intended to roast the meat or cook it from the interior outwardly as well as from the exterior inwardly so that the roast may be properly cooked in a shorter time. With the improved skewer projected into the meat roast the base plate 3 of the skewer is seated upon the bottom of the roasting pan 1 to be heated therewith. The heat from the base plate 3 is conducted upwardly through the stem or axial shaft 4 and radiation from the heated stem 4 is reduced or prevented by the air chamber 8 provided by the sleeve 6. The slight contact between the toothed lower end of the sleeve 6 and the base plate 3 prevents the sleeve 6 from receiving any great amount of heat from the base plate 3 and permits a greater amount of heat to be conducted or carried upwardly by the stem 4 to the skewer head 9 so that the heat from the base plate 3 is not dissipated or absorbed by the lower portion of the meat roast before it is permitted to heat the skewer head 9 for the purpose of conducting heat to the middle portion of the roast to cook the same from the interior. With the improved skewer provided so that the head or upper section thereof which projects into the middle portion of the meat roast arranged to receive or be heated from heat conducted from the base plate upwardly through the stem 4 the meat roast may be roasted from the interior outwardly in addition to being roasted from the heat of the oven which serves to cook the roast from the exterior inwardly.

Figure 4:
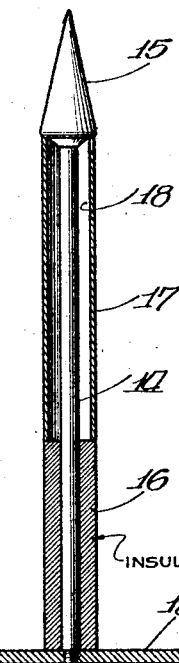
Figure 4 is a vertical detail sectional view of a modified form of skewer illustrating the head and stem in elevation.

Figure 4 illustrates a modified form of cooking skewer comprising a metal base plate 12 having a threaded opening in the middle portion thereof for the reception of the lower screw end 13 of a metal stem or shaft 14 provided with an enlarged metal skewer head 15 on its upper end. Engaged around the lower portion of the stem 14 is an insulation sleeve or collar 16 constructed of any desirable kind of insulating or non-conducting material. The insulation collar 16 provides a support for the lower end of a thin metal sleeve or casing 17 which surrounds and is spaced from the stem 14. The sleeve 17 is removably secured in position upon the upper end of the collar 16 by the skewer head 15 when the lower threaded end 13 of the skewer stem 14 is threaded into the base plate 12 as clearly illustrated in Figure 4. The sleeve 17 provides an air chamber 18 between the stem 14 and the inner surface of the sleeve 17 thereby permitting the heat from the base plate 12 to be transmitted upwardly through the stem 14 to the head 15 of the skewer to heat the same and permitting some of the heat to be transmitted to the upper portion of the sleeve 17 so that the middle portion of the meat roast in which the modified form of skewer is engaged is adapted to be cooked from the interior outwardly as well as inwardly from the exterior by the oven. The insulation collar 16 prevents radiation of the heat from the lower portion of the stem 14 so that the heat can be transmitted upwardly through the upper portion of the skewer.

Figure 5:
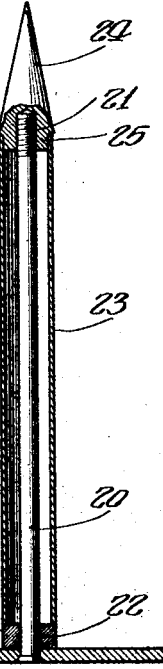
Figure 5 is a vertical sectional view of another modified form of skewer with parts shown in elevation and with parts broken away.
Figure 3:
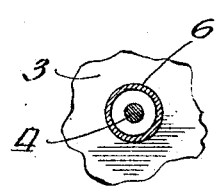
Figure 3 is a transverse detail section of the skewer taken on line III—III of Figure 2.

Figure 5 illustrates another modified form of meat or cooking skewer comprising a metal plate 19 having a countersunk middle opening therein to receive the head of a stem or shaft 20 the upper end of which is exteriorly threaded at 21. Removably engaged over the stem 20 and seated upon the top surface of the base plate 19 is an insulation disc or washer 22. Removably engaged over the stem 20 and resting upon the insulation washer 22 is a metal sleeve or casing 23 through which the stem 20 axially projects. Removably engaged on the upper threaded end 21 of the stem 20 is a skewer metal head 24 the lower end of which is reduced in diameter to provide a neck or collar 25 which projects downwardly into the upper end of the sleeve 23 to hold the same properly spaced on the stem 20.

The various types of skewers illustrated in Figures 2, 4 and 5 comprise a plurality of parts which may be readily separated one from the other to permit the skewer parts to be thoroughly cleaned after being used. The chambered sleeves or casings forming part of the various types of skewers are provided for the purpose of permitting heat from the base plate to be conducted upwardly through the stems or shafts of the skewers to the head portion before radiated into or absorbed by the outer portions of the roast or article which is being cooked. It will of course be understood that while one skewer is engaged in the meat roast 2 as illustrated in Figure 1, any number of skewers may be used depending upon the size of the roast in which the skewers are engaged. With the improved skewers it will be noted that the head portions or upper ends of the skewers are intended to be positioned in the middle or such portions of the roast or article to be cooked which normally would be cooked last. With the improved skewers, it is possible to materially reduce the time of cooking of roasts, and other articles of food so that the fuel consumption is reduced so that the cost of cooking is proportionately cut down.

It will, of course, be understood that various details of construction may be varied through a wide range without departing from the principles of this invention, and it is, therefore, not the purpose to limit the patent granted hereon otherwise than is necessitated by the scope of the appended claims.

I claim as my invention:

1. A skewer comprising a base plate, a stem connected therewith, a sleeve engaged around said stem, and spaced therefrom, and a head section connected with said stem for removably holding said sleeve in position.

2. A skewer comprising a base plate, a stem removably engaged therewith, a sleeve enclosing the stem and forming an air chamber therearound, and a head section on said stem for closing the upper end of said sleeve.

3. A skewer comprising a base plate, a sleeve thereabove, a tapered head section, and a stem connected therewith and projecting axially through said sleeve and connected with said base plate to cause the head section to close the upper end of the sleeve and hold the same secured in place between the base plate and said head section.

4. A cooking skewer comprising a base, a head, a stem connecting said base and head, a sleeve engaged around and spaced from said stem beneath said head, and an insulation member separating said sleeve from said base.

5. A skewer comprising a heat-conducting base, a stem connected therewith, a sleeve engaged around said stem and spaced therefrom to provide an air chamber in the skewer, teeth formed on one end of the sleeve and contacting the base, and a head on said stem for holding the sleeve in position.

In testimony whereof I have hereunto subscribed my name at Chicago, Cook County, Illinois.

JOHN E. HOOVER.